(12) United States Patent
Keenan et al.

(10) Patent No.: US 6,589,057 B1
(45) Date of Patent: Jul. 8, 2003

(54) INCISION TRAINER FOR OPHTHALMOLOGICAL SURGERY

(75) Inventors: Joseph F. Keenan, Cohasset, MA (US); Richard V. Kennedy, Hyannis, MA (US); Dana Cote, Saugus, MA (US)

(73) Assignee: Becton, Dickinson & Company, Franklin Lakes, NJ (US)

( * ) Notice: Subject to any disclaimer, the term of this patent is extended or adjusted under 35 U.S.C. 154(b) by 0 days.

(21) Appl. No.: 09/671,564

(22) Filed: Sep. 27, 2000

(51) Int. Cl.[7] ................................................. G09B 23/28
(52) U.S. Cl. ....................................................... 434/271
(58) Field of Search .................................. 434/262, 267, 434/270, 272, 273, 271

(56) References Cited

U.S. PATENT DOCUMENTS

| | | | | |
|---|---|---|---|---|
| 1,042,815 A | * | 10/1912 | Myers | 434/271 |
| 1,582,199 A | * | 4/1926 | Walters | 434/271 |
| 1,630,944 A | * | 5/1927 | Ingersoll | 434/271 |
| 3,177,593 A | * | 4/1965 | Loeb | 434/271 |
| 4,136,466 A | * | 1/1979 | Wrue | 434/271 |
| 4,674,503 A | | 6/1987 | Peyman et al. | 128/305 |
| 4,737,132 A | * | 4/1988 | Shunsaku | 446/348 |
| 4,761,150 A | * | 8/1988 | Lautenberger | 446/345 |
| 4,762,495 A | | 8/1988 | Maloney et al. | 434/271 |
| 4,762,496 A | | 8/1988 | Maloney et al. | 434/271 |
| 4,865,551 A | | 9/1989 | Maloney et al. | 434/271 |
| 4,865,552 A | | 9/1989 | Maloney et al. | 434/271 |
| 5,080,111 A | | 1/1992 | Pallin | 128/898 |
| 5,137,459 A | | 8/1992 | Zirm | 434/271 |
| 5,261,822 A | | 11/1993 | Hall et al. | 434/271 |
| 5,336,236 A | | 8/1994 | Nevyas-Wallace | 606/166 |
| 5,423,840 A | | 6/1995 | Casebeer et al. | 606/166 |
| 5,425,644 A | | 6/1995 | Szinicz | 434/268 |
| 5,571,124 A | | 11/1996 | Zelman | 606/166 |
| 5,766,016 A | * | 6/1998 | Sinclair | 434/262 |
| 5,785,531 A | | 7/1998 | Leung | 434/262 |
| 5,868,580 A | * | 2/1999 | Amrein | 434/271 |
| 5,893,719 A | * | 4/1999 | Radow | 434/271 |

* cited by examiner

*Primary Examiner*—Derris H. Banks
*Assistant Examiner*—Kurt Fernstrom
(74) *Attorney, Agent, or Firm*—Alan W. Fiedler (57) ABSTRACT

The present invention provides systems and methods for simulating certain regions of the anatomy involved in ophthalmological surgery. In particular, the present invention provides a practice cornea simulating dimensional, geometric and mechanical properties of a human cornea. In one embodiment, the practice cornea is seated in tight apposition to a simulated iris that is characterized by dimensional and geometric properties similar to a human iris. The practice cornea seated upon the simulated iris may be inserted into an aperture in a simulated sclera, forming therewith a smooth surface similar to that found in the anterior part of the human eye. The simulated sclera may be provided with dimensional and geometric characteristics resembling the human sclera. The combination of these elements provides an anatomic replica of the anterior part of the human eye upon which surgeons may realistically practice surgical techniques, in particular corneal incisions.

24 Claims, 7 Drawing Sheets

INCISION TRAINER FOR OPHTHALMOLOGICAL SURGERY

BACKGROUND

1. Field of the Invention

The present invention relates to systems and methods for simulating certain anatomic features of the human eye to allow trainees to practice invasive procedures upon a realistic anatomic replica. In particular, the present invention provides in one embodiment a simulation of a human cornea to permit incisions to be practiced thereupon.

2. Description of the Related Art

It is well understood in the ophthalmological art that the lens contributes only one third of the total focusing power of the eye, while the remaining two-thirds arises from the convex shape of the anterior corneal surface. It is further understood that very small changes in corneal shape may have a dramatic effect on the precision with which light rays are brought to the focus upon the retina. Incisions made in the cornea or anterior sclera during ophthalmological procedures, therefore, may change the refraction of the eye. It appears that surgically induced change in corneal contour is less significant for more peripheral incisions in the sclera or limbus than for those incisions that involve the cornea. A substantial literature in the ophthalmological art supports the premise that smaller incisions are associated with less surgically induced change in corneal contour, earlier visual recovery after surgery, more stable refraction, and better uncorrected postoperative visual acuity. Furthermore, it has been determined that the placement of sutures to close access incisions may induce astigmatism. Although for larger incisions, suture placement has been necessary to close the path between the interior of the eye and its external surface, placing sutures in the surface of the eye may combined with natural wound healing characteristics to alter the shape of the eye and thereby induce astigmatism. For all these reasons, surgeons have determined that minimizing the size of corneal incisions would be desirable.

Surgical access to the interior portions of the eye has been the subject of intensive research to discover the most effective and least traumatic technique. Scleral tunnel incisions were introduced in the early 1980s in order to provide better wound healing with less surgically induced astigmatism; these incisions permitted wider surgical exposure for cataract extraction and were modified for phacoemulsification. In 1990, the sutureless incision was developed, which utilized a longer scleral tunnel with a grooved floor in the meridian of the incision. This incision could be stretched to admit a folded lens following phacoemulsification, and could remain unsutured thereafter. The corneal entry point of this tunneled incision was shaped as a one-way valve or corneal lip so that the incision would self-seal. The temporal, sutureless, clear corneal incision for cataract surgery was described in 1992. It has now become a favored technique for cataract surgery internationally in conjunction with foldable or small-incision intraocular lenses. The development of sutureless, astigmatically neutral incisions has combined with advances in intraocular lens technology to permit major advances in the surgical treatment of cataracts. Clear corneal incisions have gained ascendancy over recent years for a variety of cataract extraction techniques.

For cataract surgery using small-incision techniques, the incision for which the surgical tools are inserted generally approximates the circumference of the tools that are inserted therethrough. If the incision is too small, corneal tissue surrounding the incision may be damaged by stretching or by thermal injury. If the incision is too large, leakage from the unsutured passageway may occur after surgery with potentially disastrous consequences. The angle of the incision is also important to allow optimal surgical access while still permitting self-sealing. A number of variations on surgical techniques exists for performing clear corneal incisions. An initial incision method involved making incision in a single plane. Subsequently, a perpendicular groove of 300 to 400 microns in depth was added to the incision to form a superior lip, resulting in less tendency for tearing. Special surgical tools may be used to form these delicate incisions. For example, a diamond knife which is beveled on all edges may be used whose dimensions are specifically constructed so that the tip of the diamond is a preselected distance (e.g., 1.75 mm ) from a line joining the shoulders of the blade. Using such a knife, an incision may be constructed by applanation of the wall of the eye, so that the tip is at the anterior edge of the vascular arcade. From that position, the knife may be advanced in the plane of the cornea until a line that joins the shoulders reaches the incision, at which point the tip is tilted down through Descemet's membrane before the initial plane is re-established, at which point the knife is inserted to the hilt. As a result, a rectangular incision 3 mm wide and 2 mm long is formed. It is understood that incisions of less than 3 mm width in the peripheral cornea are astigmatism neutral as long as they are constructed with sufficient accuracy. Other methods for forming clear corneal incisions are familiar to skilled practitioners in the field. Often, anatomic landmarks, such as the angle of the sclera, the angle of the iris or the curvature of the cornea, are used to guide the direction for inserting the ophthalmological scalpel as the incision is formed. For many clear corneal incisions, widths between 2.5 mm and 3 mm are commonplace. These incisions permit subsequent access to the cataract using the variety of techniques well-known in the art. While the incisions described above are generally familiar to ophthalmologic surgeons, innovation in technique and instrumentation is ongoing. New surgical incisions and new surgical tools may be devised to facilitate access to intraocular structures through the clear cornea or through other anatomic areas of the eye.

The size of these incisions, the complexity of their geometry and their location in the optically sensitive corneal region makes it imperative that they be made cleanly and accurately. There is little if any room for error. A poorly made incision may require corrective steps to be taken that eliminate the incision's purported advantages and that introduce other potential complications. Without both training and practice, it is difficult for physicians to form these incisions consistently and precisely. Not only must trainees and less experienced surgeons be able to practice established techniques using commonplace instrumentation, but also must well established surgeons have an opportunity to practice in order to learn a new surgical method or to try out a new surgical tool.

Currently, a surgeon wishing to learn an unfamiliar skill and gain proficiency therein has a limited number of options for learning and practicing. In time-honored manner, the surgeon may practice in vitro using an animal eye or may initially try out an instrument or practice a skill on a patient during actual surgery. There are limitations to both options. The animal eye in a fresh or preserved state may lack of the surgical characteristics of a living human patient's eye. The animal eye may also introduce sanitary and hazardous material issues. Using the patient undergoing eye surgery as a laboratory for learning new skills or experimenting with new instruments is even more undesirable.

There exists in the art, therefore, a need for a training system that simulates surgical characteristics of the human eye, especially those characteristics relevant to trans-corneal incisions. Other simulation systems for training surgeons exist for specific body parts. The development of endoscopic surgery, for example, has given rise to a number of training devices to teach surgeons endoscopic skills. For ophthalmological surgery, a device called "Marty the Surgical Simulator" is available for training surgeons to operate upon the lens. "Marty" provides a synthetic cataract within a simulated eyeball upon which a surgeon can practice cataract procedures. However, "Marty," covered by U. S. Pat. Nos. 4,762,495, 4,762,496, 4,865,551, 4,865,552, and 5,261,822, is not configured to be used for incision training. There remains in the art, therefore, a need for a practice system that replicates the anatomic and surgical characteristics of the eye as encountered by surgeons carrying out clear corneal surgery in actual patients. This need will continue to grow as the complexity of surgical methods and instrumentation for trans-corneal surgery continues to advance.

SUMMARY OF THE INVENTION

It is therefore an object of the present invention to provide a system for ophthalmological surgical training that includes a base, a removable corneal portion configured for placement over the upper portion of the base, and a cover that has an aperture in its top so that placing of the cover over the base permits the corneal portion to extend through the aperture, and results in securing the corneal portion across the aperture between the upper portion of the base and the top end of the cover. In certain embodiments, the top of the cover has a curvature that approximates an angle of curvature of the human sclera. In certain embodiments, the cover includes a flange that facilitates placement of the cover onto and removal of the cover from the base by the user. In certain embodiments, a mechanism may be included to permit a secure engagement between the cover and the base. This mechanism may include a groove at the lower portion of the base and a protrusion at the bottom end of the cover for removable engagement with the groove. This mechanism may, alternatively, include a plurality of threads along a portion of the base and complementary threads along an interior surface of the cover. In certain embodiments, the corneal portion is made from a material which simulates a surgical characteristic of human corneal tissue when incised.

It is a further object of the present invention to provide a simulation system for ophthalmological surgery that includes a central member that has a top surface geometrically configured to simulate a human iris, a housing that may cover the central member that has a top portion configured to simulate the anterior sclera of the human eye and that has an aperture in its center so that the top surface of the central member can protrude through when the housing is positioned to cover the central member, and an artificial cornea removably affixable to the top surface of the central member. In certain embodiments, the artificial cornea affixed to the top surface forms a chamber therebetween that is substantially similar in dimension or in mechanical properties to the anterior chamber of the human eye. In certain embodiments, the artificial cornea may be fabricated from a material that simulates a surgical characteristic of the human cornea. In certain embodiments, the central aperture of the housing is dimensionally adapted for holding the artificial cornea and the top surface tightly therein. In certain embodiments, the central member has a bottom end that is stabilizable upon a work surface. In other embodiments, the housing has a bottom surface that is stabilizable upon the work surface. In certain embodiments, the top portion of the housing includes a sloped periphery surrounding the central aperture that is geometrically configured to simulate a slope of the anterior sclera of the human eye. In certain embodiments, the engagement of the housing with the artificial cornea forms a smooth surface that simulates a shape of the anterior aspect of the human eye and further produces within the chamber a pressure that is substantially similar to the anterior chamber pressure of the human eye. The housing may bear an affixation means that mates with a complementary affixation means on the central member of the base, allowing the central member to be removably affixed to the housing and to be stably encased therein. In certain embodiments, an artificial pupil may be included, or an artificial lens may further be included that is accessible through the artificial pupil.

It is also object of the present invention to provide a system for practicing a corneal incision that includes a practice cornea, an artificial iris upon which the practice cornea may be removably seated, and an artificial sclera detachably affixable to the artificial iris. In this embodiment, the artificial iris and the artificial sclera may simulate a dimensional and a geometric characteristic of the human eye; furthermore, the practice cornea may simulate a dimensional and a mechanical characteristic of the human cornea; and furthermore, the assembly of the practice cornea, the artificial iris, and the artificial sclera may simulate in size and shape a portion of the human eye, thereby permitting practicing the corneal incision in a realistic manner. In certain embodiments, the artificial sclera may include a central aperture through which the practice cornea seated upon the artificial iris may protrude in an anatomically correct geometric configuration; in this embodiment, the central aperture further stabilizes the practice cornea upon the artificial iris. In certain embodiments, the central member may bear a top surface that forms the artificial iris. In these embodiments, the central member may be dimensionally adapted for directing the practice cornea seated upon the artificial iris into the aperture. In these embodiments, further, the central member may be removably affixable within the housing; such affixation may serve to stabilize the artificial cornea securely upon the artificial iris. In one embodiment, there may be included in the system a simulated feature of the human face.

It is an additional object of the present invention to provide methods for training surgical incision-making. In one practice of the present invention, the method includes providing a practice cornea affixed to an artificial iris in an anatomically correct position; providing a surgical tool suitable for making an incision in a human cornea; determining a surgically proper angle for incising a human cornea; and incising the practice cornea by inserting the surgical tool into it at the surgically proper angle. In one practice of the method, the step of evaluating the incision in the practice cornea to determine a morphological characteristic thereof may be included. In certain practices, the surgically proper angle is substantially similar to the angle of curvature of the human iris. In other practices, the surgically proper angle is substantially similar to the angle of curvature of the human sclera. A practice of the present method may further include the following steps: removing the practice cornea; affixing an intact practice cornea to the practice iris in an anatomically correct position; and incising the intact practice cornea by directing the surgical tool into the intact practice cornea at a preselected angle. This practice may further include the evaluation of the intact practice cornea after it has been incised in order to determine a morphological characteristic thereof.

These and other aspects of the invention will be more fully understood by referring to the following detailed description and the accompanying drawings, wherein like numbers reference like features.

BRIEF DESCRIPTION OF THE FIGURES

The features of the invention believed to be novel are set forth with particularity in the following claims. However, the systems and methods of the invention itself, together with further objects and advantages of thereof, may be best understood by reference to the following description of illustrative embodiments taken in conjunction with the accompanying drawings, wherein:

DETAILED DESCRIPTION OF THE ILLUSTRATED EMBODIMENTS

Figure 1:
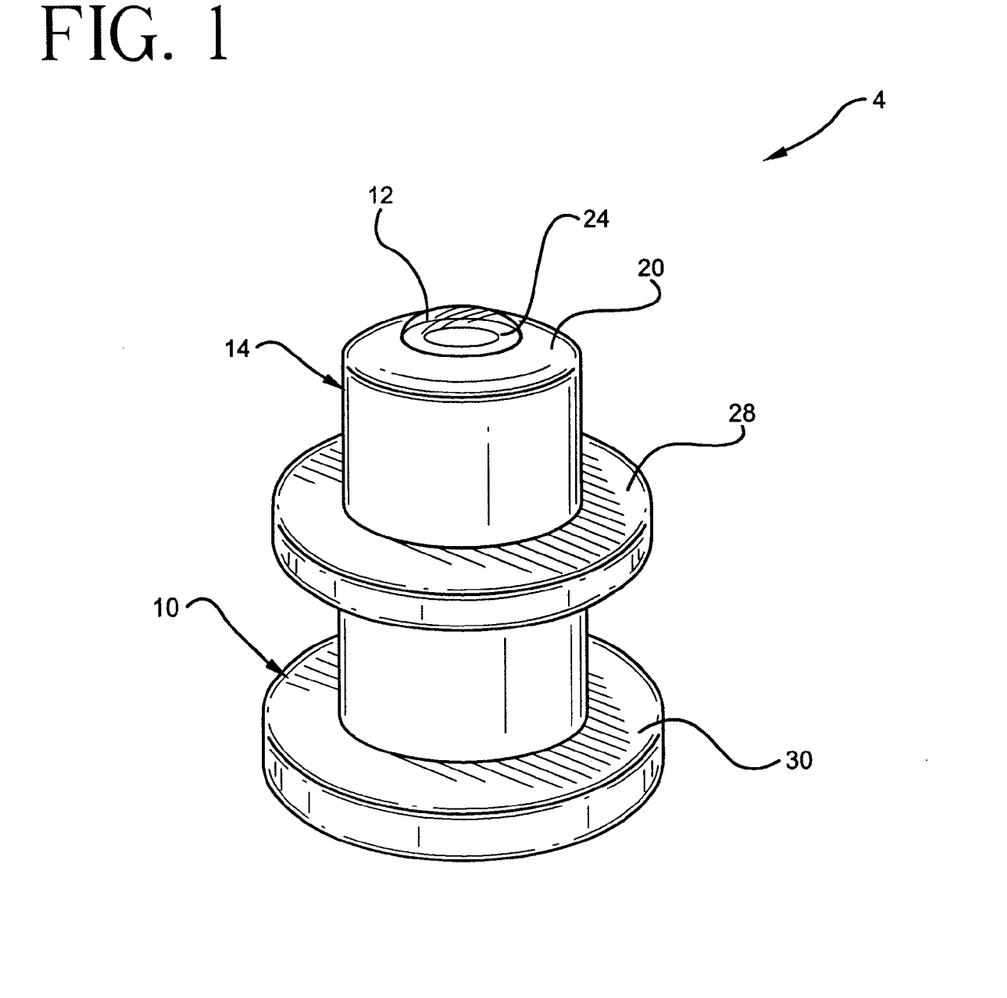
FIG. 1 shows a perspective view of a simulation system for ophthalmological surgery according to the present invention.

FIG. 1 shows an embodiment of an assembled simulation system 4 according to the present invention. The figure shows a base 10, an artificial cornea 12, and a housing 14 assembled so that the artificial cornea 12 protrudes through the top portion 20 of the housing. In the depicted embodiment, the top surface 24 of the central member is arranged to simulate an artificial iris. This will be shown in more detail in subsequent figures. The illustrated embodiment also shows a flange 28 or grasping ridge provided to facilitate the user's manipulation of the simulation system 4 and further adapted for facilitating assembly of the housing 14 to cover the base 10. The depicted embodiment further features a bottom end 30 that is stabilizable upon a work surface. Other shapes and configurations of a stabilizing bottom end 30 may be incorporated in the assembly of the simulation system 4 to permit its stabilization upon a work surface. While the depicted embodiment shows the simulation system 4 as freestanding, it is understood that other arrangements are contemplated by the present invention. The simulation system 4 may be incorporated as part of a larger stabilizing system within which the simulation system 4 may be housed. For example, the simulation system 4 may be housed within a replica of an anatomic feature. As another example, the simulation system 4 may be housed within a work area whose planes and contours simulate certain geometric features of the anatomic regions surrounding the human eye. Arranging the simulation system 4 within a larger work area whose shapes simulate certain shapes found in normal human anatomy may provide the user with a practice experience that more accurately resembles the actual experience encountered in performing ophthalmological surgery upon a human patient. These arrangements whereby the simulation system 4 forms a component of a larger surgical training system are intended to fall within the scope of the present invention.

Figure 2:
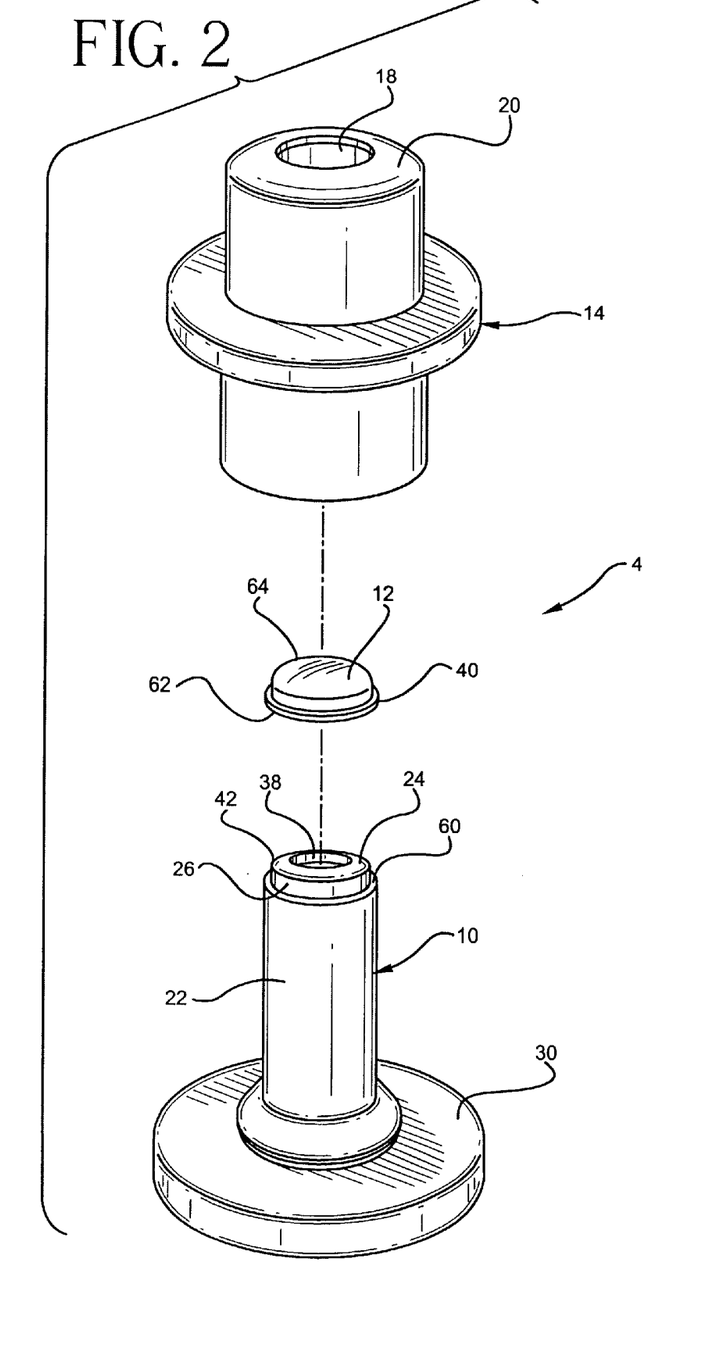
FIG. 2 shows an exploded view of a simulation system for ophthalmological surgery according to the present invention.

FIG. 2 shows an exploded view of assembly of a simulation system 4 for ophthalmological surgery training according to the present invention. The figure generally shows the of the housing 14 arranged to cover the base 10. The base 10 includes a central member 22 whose top surface 24 is adapted for engaging the artificial cornea 12. The base 10 illustrated in this figure is provided with a bottom end 30 suitable for stabilization upon a work surface. FIG. 2 further shows an artificial cornea. 12 adapted for fitting over the top surface 24 of the central member 22. The artificial cornea 12 is a dome shaped structure formed to simulate the size, the shape, and the surgical characteristics of human corneal tissue. A surgical characteristic is understood to be a property perceived when the material is handled with techniques or tools that are routinely employed by practitioners of ordinary skill in the surgical arts when they are performing surgery on the actual anatomic structures simulated by the anatomic replica. The surgical characteristic would be perceived by the user of the simulation system 4 when he or she was practicing surgical techniques or using surgical tools thereupon. For example, a surgical characteristic of human corneal tissue would be its resistance to penetration by or incision with an ophthalmological scalpel. As another example, a surgical characteristic of human corneal tissue would be perceived by the user as the amount of resistance provided when the user applied a scalpel in order to make an incision of a particular controlled depth. According to the present invention, the artificial cornea 12 may be fabricated from a material specifically selected to simulate one or more surgical characteristics of human corneal tissue when incised. Examples of useful materials include thermoplastic elastomers, silicones and hydrogels. Other materials appropriate for simulating surgical characteristics may be well known within the art, or may be identified using no more than routine experimentation.

As shown in FIG. 2, the artificial cornea 12 may be equipped with a lip 40 that facilitates the positioning of the artificial cornea 12 over the top surface 24 of the central member 22. In the depicted embodiment, the top surface 24 is configured to simulate the slope and shape of a human iris. The top surface 24 may be equipped with a circumferential rim 42 that engages a corresponding groove (not shown) on the anterior aspect of the artificial cornea 12. Alternatively, the artificial cornea 12 may be fabricated to fit snugly over the surface 24 with its interior aspect engaging the lateral aspect 26 of the top surface. In this configuration, the bottom edge 62 of the artificial cornea 12 may rest upon a ledge 60 of the central member 22 to be supported thereupon. In the depicted embodiment, a hollowed out area has been provided in the top surface 24 to replicate an artificial pupil 38. The size of the artificial pupil 38 may be varied to simulate different surgical conditions. Changes in the size of the artificial pupil 38 to simulate pupil dilation, for example, may also change the size and geometries of the top surface 24 of the central member, which has been configured to simulate an artificial iris. The artificial pupil 38 may alternatively be constructed as an aperture permitting access to simulated anatomic structures positioned interior to the artificial pupil 38; in other embodiments, simulated anatomic structures may be approached during practice surgery through the artificial pupil 38 after appropriate incisions have been made in the artificial cornea 12.

FIG. 2 further illustrates, an embodiment wherein the housing 14 is positioned to cover the unitary assembly of the artificial cornea 12 placed upon the top surface 24 of the central member 22. In the depicted embodiment, the housing 14 is dimensionally adapted for engaging the unitary assembly of the artificial cornea with the top surface 24 of the central member 22. The housing 14 is provided with a top portion 20 which is configured to simulate the anterior sclera of the human eye. As shown in the figure, the top portion may have a slope, a curvature, and an overall circumference that simulates those characteristics of the human eye. The housing 14 is further provided with an aperture 18 centered in the top portion 20. The unitary assembly of the artificial cornea 12 and the top surface 24 fits snugly within the aperture 18, with the domed upper surface 60 of the artificial cornea 12 protruding through the aperture 18 and forming a smooth junction between the edge of the artificial cornea 12 and the top portion 20 of the housing 14, said smooth junction simulating the anatomic arrangement at the junction between the human cornea and the human sclera. As seen in this figure, the artificial cornea 12 is readily attachable to and removable from its affixation to the top surface 24 of the central member 22. This feature permits the user to install the artificial cornea 12 easily. Furthermore, the artificial cornea 12 may be removed after practice surgery has been performed upon it, so that practice incisions made into its substance may be inspected for proper size, proper angulation, and for irregularities. The artificial cornea 12 may be a disposable item that can be discarded after a certain number of practice incisions have been made. A fresh artificial cornea 12 may be placed upon the top surface 24 so that further practice incisions may be made.

Figure 3:
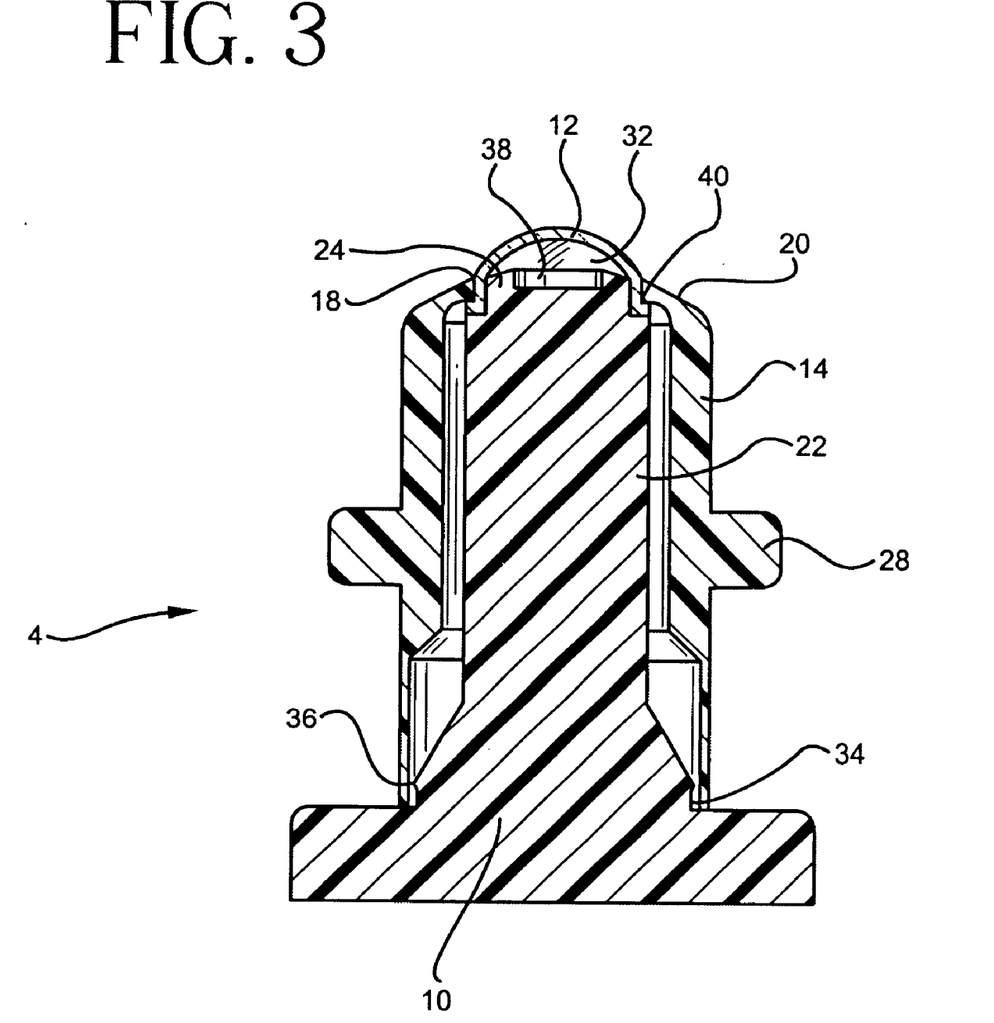
FIG. 3 shows a cross-sectional view of a simulation system for ophthalmological surgery according to the present invention.

FIG. 3 shows a cross-sectional view of an assembled simulation system 4 according to the present invention. In this illustration, the housing 14 is shown encasing the central member 22. A bottom surface 30 of a base 10 is seen resting on a work surface. The housing 14 and the base 10 are secured to each other by an affixation means 34. The affixation means 34 as shown in this figure is positioned on the housing 14. It is matched by a complementary affixation means 36 incorporated in the base portion 10 of the central member. While the affixation means displayed here shows a radial protrusion in the base 10 that cooperates with a radial groove in the housing 14, a variety of affixation means will be readily apparent to practitioners of ordinary skill in the art. For example, the radial protrusion may be positioned on the housing 14, with the complementary radial groove on the other component. Or, for example, the radial protrusion and the grooves need not be circumferential but may be confined to certain discrete areas on each component. As another example, a locking tab may be used that can be released by the user's finger pressure. The pressure point permitting release of the locking tab may be configured as a button or as a vertical or transverse bar that the user may press. In one embodiment, affixation means may include sets of complementary threads on the housing 14 and on the base 10 so that the housing 14 may be screwed on to the base 10. In another embodiment, the affixation means may include a slot directed vertically into the base into which a tongue of the housing may be inserted. In the depicted embodiment, a flange 28 on the housing 14 may be seen. This flange 28 or grasping ridge is provided so that the user may securely grasp the housing 14 during practice surgery on the artificial cornea 12, and may further manipulate the housing 14 to remove it from its affixation to the central member or the base. In other embodiments, this flange 28 may be optional or may be replaced with other mechanisms that permit the user to stabilize or manipulate the device. A roughened surface of the housing 14, for example, may allow the user to separate the components of the system 4. In one embodiment, the system 4 may be imbedded in or surrounded by a set of contours simulating features of the orbital area. In this embodiment, the housing may be equipped with an appropriate attachment mechanism to affix it to the set of contours in a stable manner. Other affixation and manipulation arrangements, all falling within the scope of this disclosure, may also be envisioned by skilled artisans.

FIG. 3 further shows the attachment of the top portion 20 of the housing 14 as it interfaces with the cornea 12 seated upon the top surface 24 of the central member 22. The top portion 20 of the housing is provided with a central aperture 18 that permits the artificial cornea 12 seated upon the top surface 24 to protrude therethrough. As illustrated in FIG. 3, when the artificial cornea 12 seated upon the top surface 24 has been positioned protruding through the central aperture 18, a chamber 32 is formed between the inner surface of the artificial cornea 12 and the top surface 24 of the central member. The secure seating of the housing 14 over the central member 22 in the illustrated embodiment clicks these two structures tightly into position with respect to each other and further tightly affixes the artificial cornea 12 between the inner edge of the aperture 18 and the outer edge of the top surface 24. This secure seating also serves to pressurize the chamber 32 with a pressure simulating the pressure found in the anterior chamber of the human eye. This pressure within the chamber 32 is therefore directed against the artificial cornea 12, simulating for the surgeon the pressure that supports the cornea of a human eye. A properly pressurized artificial cornea 12 provides for the surgeon a realistic setting for practicing corneal incisions. The affixation means 36 and its complementary affixation means 34 are calibrated so that directing these two structures together to affix the housing 14 to the base or central member further exerts a force on the artificial cornea 12 that increases the pressure within the chamber 32 so that that pressure simulates the pressure in the anterior chamber of the human eye.

Figure 4:
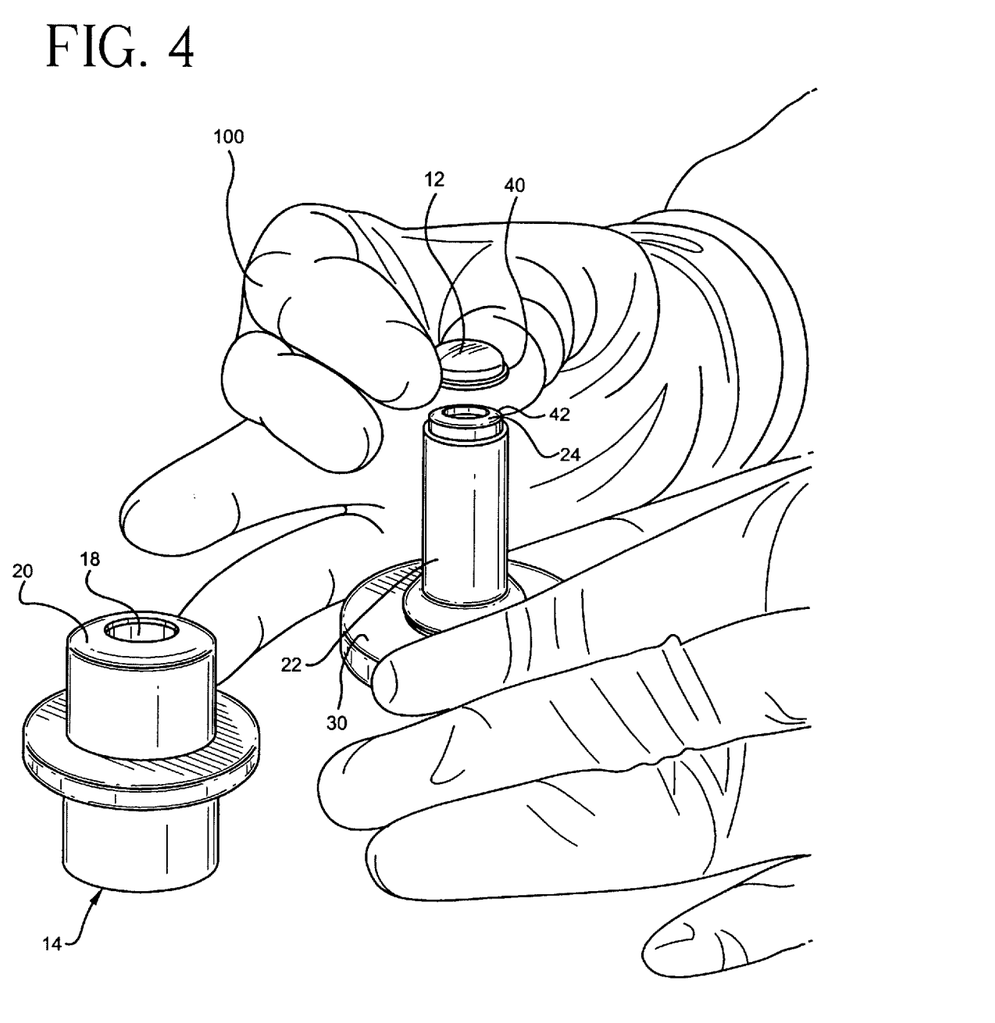
FIG. 4 illustrates the assembly of components of an embodiment of a simulation system according to the present invention.

FIG. 4 shows a user applying an artificial cornea 12 to top surface 24 of the central member 22, said top surface 24 here being configured as an artificial iris. The artificial iris is formed from the top surface 24, and has a size and a slope and a surface that simulates the human eye. The artificial iris the depicted in this figure has a protruding rim 42 that may engage the inner aspect of the artificial cornea 12 to secure it thereupon. Alternatively, the artificial cornea 12 and the top surface 24 may be fabricated so that a press fit will tightly affix the two structures together. In the illustrated embodiment, the artificial cornea 12 is provided with a circumferential lip 40. This lip facilitates placing the artificial cornea 12 over the top surface 24, and further facilitates removing the artificial cornea 12 therefrom. Furthermore, as shown in FIG. 3, the lip 40 of the artificial cornea 12 may be caught between the housing 14 and the central member 22 to allow the affixation of the housing 14 over the central member 22 to pressurize the chamber 32 formed within the artificial cornea 12.

Figure 5:
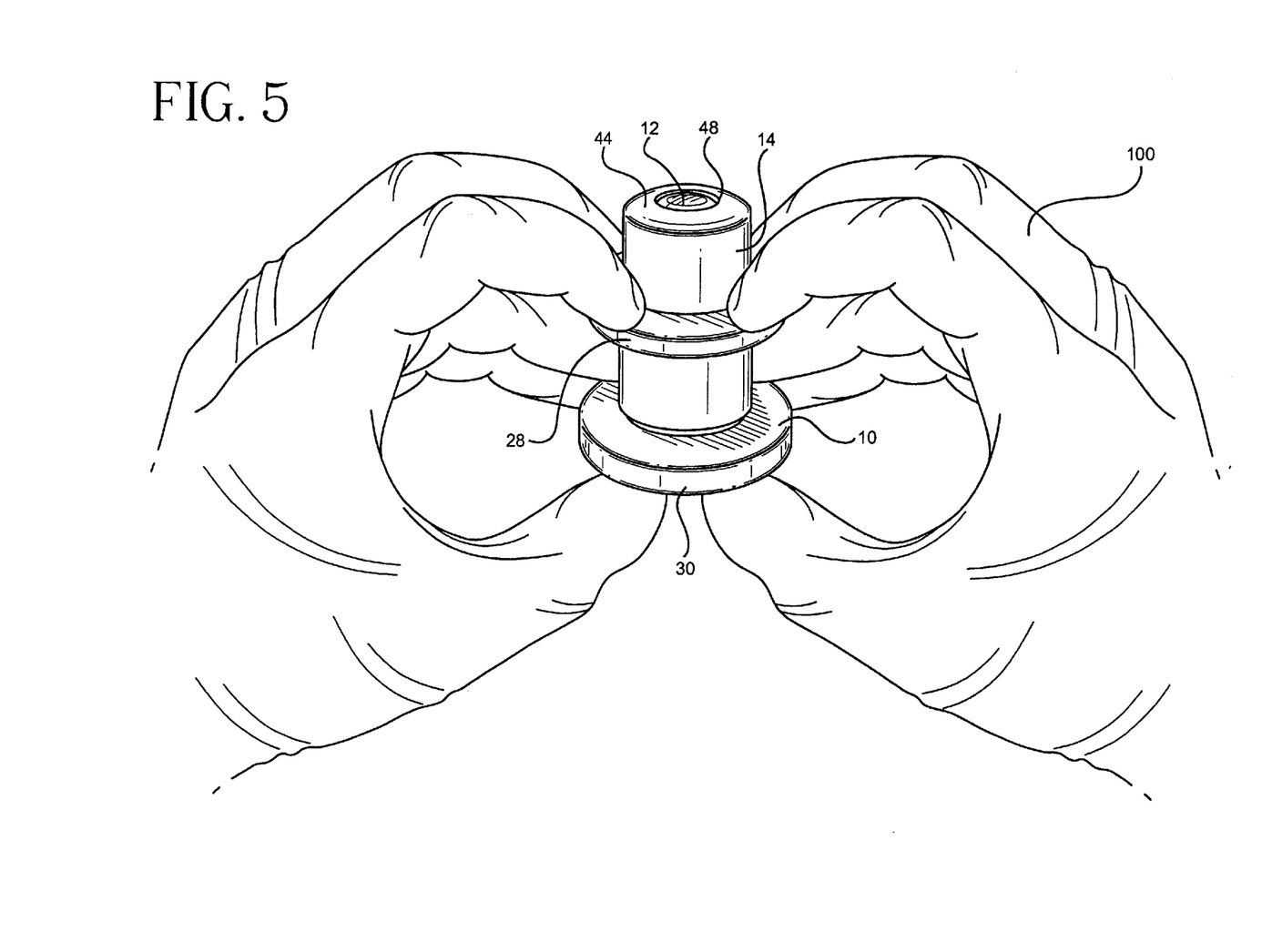
FIG. 5 shows the assembly of components of an embodiment of a simulation system according to the present invention.

As shown in FIG. 4, the user first places the artificial cornea 12 over the top surface 24 of the central member 22, grasping the bottom end 30 of the base to stabilize the structures. The user then positions the housing 14 over the central member 22 so that the artificial cornea 12 seated upon the top surface 24 protrudes through the central aperture 18. The top portion 20 of the housing 14 may be provided with dimensions and a slope that simulate the geometry of the the sclera. FIG. 5 shows the assembly of the system's components shown in FIG. 4. As shown here, the housing 14 may be secured to the central member and the base 10 by snapping these components together. To affix the housing over the central member, the user may place thumbs beneath the bottom end 30 and may place fingers upon the flange 28 or grasping ridge. Exerting downward finger pressure on the flange 28 along with upward pressure on the bottom end 30 is sufficient to snap the two components together, engaging the affixation means and complementary affixation means as illustrated previously. When the housing 14 has been properly positioned over the central member 22, a simulated anterior portion of an eye may be formed that is dimensionally, geometrically, and anatomically accurate. The top portion of the housing forms an artificial sclera 44. The artificial cornea 12 joins with the artificial cornea 44 to form a smooth transitional zone 48 that simulates the normal anatomic junction between the cornea and the sclera in the human eye.

Figure 6:
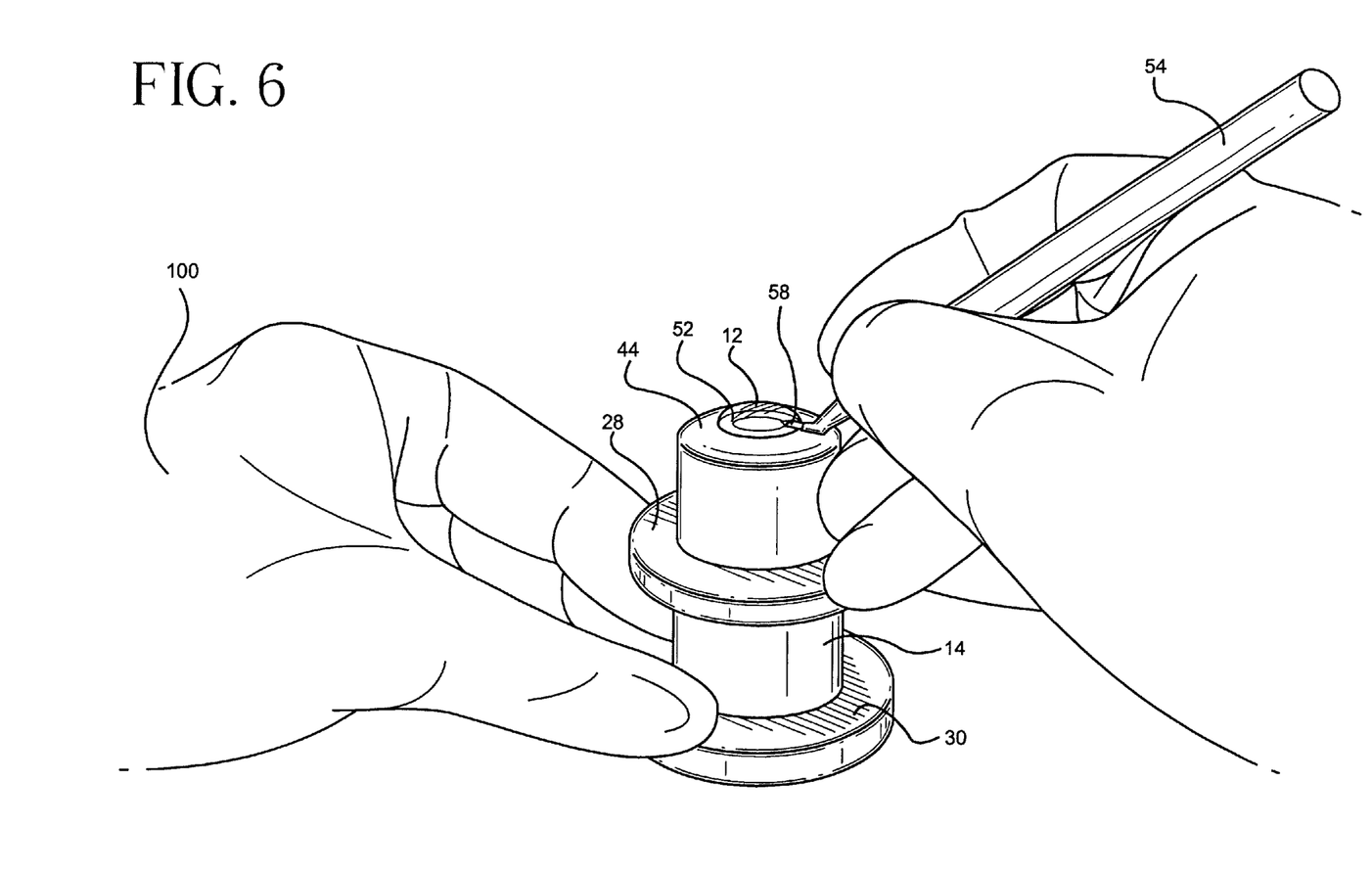
FIG. 6 depicts schematically a practice of a method according to the present invention.

FIG. 6 illustrates a user 100 practicing a corneal incision according to the systems and methods of the present invention. In the figure, the user 100 is stabilizing the practice system by grasping the bottom end 30. In other embodiments, the practice system may be imbedded in other types of holders so that the user 100 need not grasp the system itself. For example, the practice system may be imbedded in a larger contoured surface that simulates geometries, dimensions, or anatomic features of the human face. As shown in FIG. 6, the user 100 is grasping a surgical tool 54 using a precision grip familiar to practitioners in this art. While it is shown here that the user 100 is resting the ulnar fingers of the hand upon the flange 28, it is understood that other configurations of the housing may be provided upon which the user may rest all or part of the hand. For example, if the practice system is imbedded in a larger contoured surface, the user's hand may rest upon all or part of this surface. As shown in FIG. 6, the user 100 is directing the surgical tool 54 into the practice cornea 12 at a surgically proper angle 58. The artificial cornea 12, the artificial iris 52, which may be fabricated from the top surface 24 of the central member (not shown), and the artificial sclera 44, which may be fabricated from the top portion 20 of the housing 14 as shown here, are all combined to simulate for the user the dimensions and geometry of the anterior surface of a human eye. Specifically, the artificial sclera 44 has a slope and dimensions that simulate those of the human sclera. Similarly, the artificial iris 52 has dimensions and a slope that simulate those of the human iris. Accordingly, the user 100 may use the slope of the artificial iris 52 or the slope of the artificial sclera 44 to guide the direction of the incision into the artificial cornea 12 to form a surgically proper angle 58 of incision. Furthermore, the pressure supporting the artificial iris 12, as has been previously described, simulates the pressure supporting a human cornea. Therefore, as the user 100 directs the surgical tool 54 into the artificial iris 12 at the surgically proper angle 58, the user 100 will encounter resistance that simulates the natural situation. In addition, as has been discussed previously, the artificial cornea 12 is fabricated from materials that simulate a surgical characteristic of the human cornea. The combination of all these features provides for the user 100 a simulation of human surgical anatomy that has a look and feel sufficiently close to the surgical experience that the user 100 may practice surgical techniques realistically.

Figure 7:
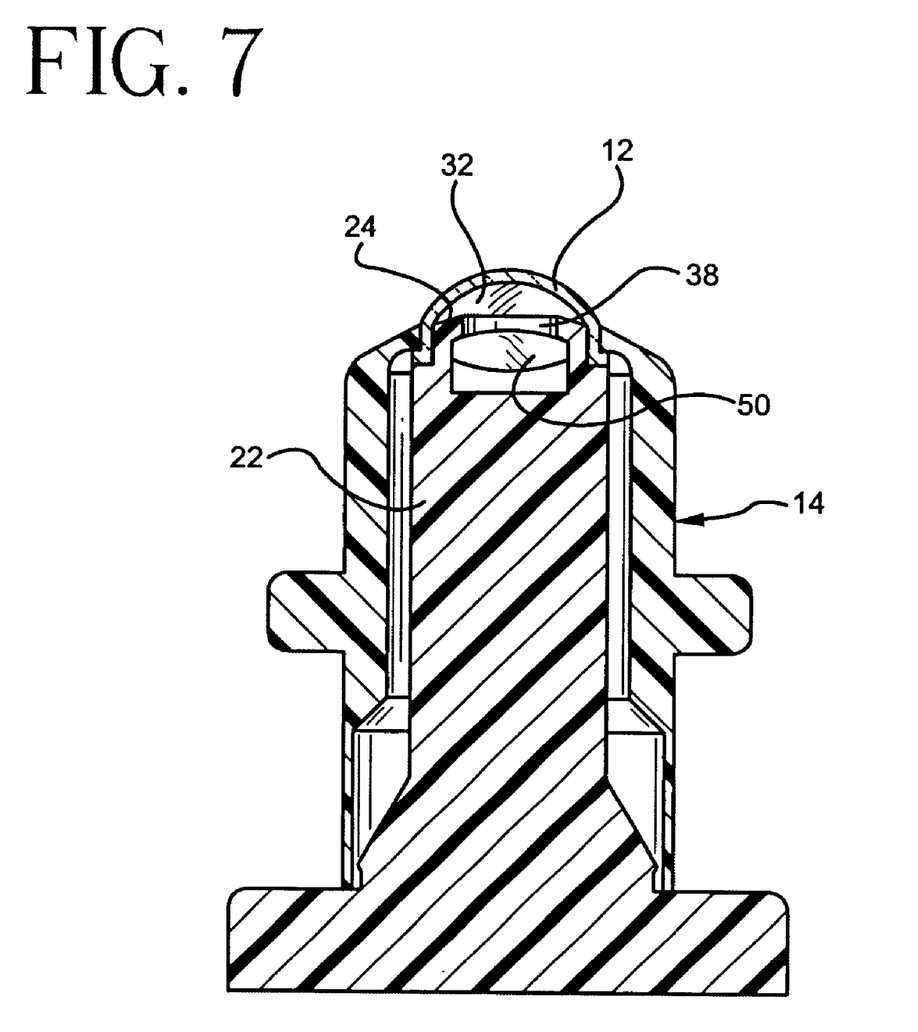
FIG. 7 shows a cross-sectional view of a simulation system for ophthalmological surgery according to the present invention.

In a preferred embodiment, the simulation systems and methods of the present operation are directed towards practicing corneal incisions. However, it is understood that incisions are commonly made in the cornea in order to approach deeper structures. For example, a variety of clear corneal incisions are used for cataract surgery. The present invention, therefore, provides a system for practicing corneal incisions through which simulated deeper tissues may be approached. FIG. 7 illustrates an embodiment of a system according to the present invention that will permit practicing an incision through an artificial cornea 12 and gaining access therethrough to an artificial lens 50. The features of the housing 14 and the central member 22 depicted in FIG. 7 are similar to those features shown in more detail in FIG. 3. However, in FIG. 7, it may be appreciated that an artificial lens 50 is positioned deep to an artificial pupil 38. The artificial pupil shown in FIG. 7 is shaped as an aperture through which a surgical tool entering the pressurized chamber 32 may be directed by the user toward the artificial lens 50 to perform further manipulations. The top surface 24 of the central member is configured here as an artificial iris. The system depicted in FIG. 7 will allow the efficacy: of practice incisions in the artificial cornea 12 to be evaluated as they relate to manipulating an artificial lens. This system will further permit trainees to determine the effects that manipulating the artificial lens 50 through a practice incision in the artificial cornea 12 might have on the artificial corneal incision itself. For example, poorly executed manipulations of the artificial lens may traumatize the edges of the corneal incision or may extend it inadvertently. It may be useful for trainees to practice working on deeper structures with the opportunity to see whether their maneuvers damage the corneal access incision.

The embodiments depicted and described herein are considered in all respects to be illustrative and not restrictive, the scope of the invention being indicated by the appended claims rather than by the foregoing description. All variations that come within the meaning and range of equivalency of the following claims therefore are intended to be embraced thereby.

We claim:

1. A system for opthalmology surgery training, the system comprising:
    a base having an upper portion and a lower portion;
    a removable corneal portion configured for placement over the upper portion of the base;
    a cover having an aperture at its top end, such that placement of the cover over the base permits the corneal portion to extend through the aperture, and results in the securing of the corneal portion across the aperture between the upper portion of the base and the top end of the cover; and
    a mechanism to permit a secure engagement between the cover and the base, the mechanism including a groove at the lower portion of the base and a protrusion at a bottom end of the cover for removable engagement with the groove.

2. The system of claim 1, wherein the top end of the cover is provided with an angle of curvature substantially equal to an angle of curvature of a human sclera.

3. The system of claim 1, wherein the upper portion of the base simulates an iris configured to complementarily engage within the aperture of the cover.

4. The system of claim 1, wherein the base includes a surface at its lower portion to permit the base to be free standing.

5. The system of claim 1, wherein the cover includes a flange to permit a user to facilitate placement of the cover onto and removal of the cover from the base.

6. The system of claim 1, wherein the mechanism includes a plurality of threads along a portion of the base and complementary threads along an interior surface of the cover.

7. The system of claim 1, wherein the corneal portion is made from a material which simulates a surgical characteristic of human corneal tissue when incised.

8. The system of claim 7, wherein the material includes one of a thermoplastic elastomer, silicone rubber and hydrogel.

9. A simulation system for ophthalmological surgery, comprising:

a central member having a top surface configured to simulate a human iris;

a housing dimensionally adapted for removably covering the central member and having a bottom portion and a top portion, said top portion being configured to simulate an anterior sclera of a human eye, and said top portion having an aperture centered therein, wherein the top surface of the central member protrudes through the central aperture when the housing is positioned to cover the central member; and an artificial cornea removably affixable to the top surface of said central member, wherein the artificial cornea affixed to the top surface forms a chamber therebetween having substantially the same dimension as an anterior chamber of the human eye, and wherein an engagement of the housing with the artificial cornea forms a smooth surface that simulates a shape of an anterior aspect of thea human eye and further produces within the chamber a pressure substantially equal to an anterior chamber pressure in the human eye.

10. The simulation system of claim 9, wherein the chamber simulates the human eye.

11. The simulation system of claim 9, wherein the artificial cornea comprises a material which simulates a surgical characteristic of the human cornea.

12. The simulation system of claim 9, wherein the central member comprises a bottom end that is stabilizable upon a work surface.

13. The simulation system of claim 9, wherein the central aperture is dimensionally adapted for holding the artificial cornea and the top surface tightly therein.

14. The simulation system of claim 9, wherein the top surface of housing further comprises a sloped periphery surrounding the central aperture that is geometrically configured to simulate a slope of an anterior sclera of a human eye.

15. The simulation system of claim 9, wherein the housing comprises a bottom surface stabilizable upon a work surface.

16. The simulation system of claim 9, wherein the housing bears an affixation means that mates with a complementary affixation means on the central member, thereby to removably affix the central member to the housing and stably encase the central member within said housing.

17. The simulation system of claim 9, wherein the top surface includes an artificial pupil that simulates a pupil of the human eye.

18. The simulation system of claim 17, further comprising an artificial lens accessible through the artificial pupil.

19. A system for practicing a corneal incision, comprising:

a practice cornea, an artificial iris upon which the practice cornea is removably seated to form a chamber therebetween having substantially the same dimension as an anterior chamber of a human eye, and an artificial sclera detachably affixable to the artificial iris to form a smooth surface that simulates a shape of an anterior aspect of the human eye and further produces within the chamber a pressure substantially equal to an anterior chamber pressure in the human eye, wherein the artificial iris and the artificial sclera simulate the human eye, wherein the practice cornea simulates a human cornea, and wherein an assembly of the practice cornea, the artificial iris and the artificial sclera simulate a size and a shape of a portion of the human eye, thereby permitting practicing a corneal incision.

20. The system of claim 19, wherein the artificial sclera further comprises a housing with a central aperture through which the practice cornea seated upon the artificial iris protrudes in an anatomically correct geometric configuration and by which the practice cornea is stabilized upon the artificial iris.

21. The system of claim 20, further comprising a central member with a top surface that forms the artificial iris, said central member being dimensionally adapted for directing the practice cornea seated upon the artificial iris into the aperture and further being removably affixable within the housing, thereby to stabilize the artificial cornea securely upon the artificial iris.

22. The system of claim 21, wherein the central member further stabilizes the assembly upon a work surface.

23. The system of claim 19, further comprising a simulated feature of a human face.

24. The system of claim 19, further comprising an artificial lens positioned in an anatomically correct position relative to the artificial iris, wherein a corneal incision provides access to the artificial lens for performing simulated surgery thereupon.

* * * * *